March 17, 1970 — L. F. KRULIK ET AL — 3,501,524

METHOD FOR PRODUCING THIOUREA

Filed May 19, 1966

INVENTORS
LEON F. KRULIK
THOMAS I. GILBERT

BY Hoffmann and Yount

ATTORNEYS

United States Patent Office 3,501,524
Patented Mar. 17, 1970

3,501,524
METHOD FOR PRODUCING THIOUREA
Leon F. Krulik, Lakewood, and Thomas I. Gilbert, Lorain, Ohio, assignors to The Elco Corporation, Cleveland, Ohio, a corporation of Ohio
Filed May 19, 1966, Ser. No. 551,299
Int. Cl. C07c 157/00
U.S. Cl. 260—552
1 Claim

ABSTRACT OF THE DISCLOSURE

A method of and apparatus for producing thiourea wherein an aqueous calcium cyanamide slurry is continuously fed into a closed chamber and caused to flow through the chamber in one direction. Hydrogen sulfide gas is fed into the chamber downstream from the introduction of the slurry and caused to flow in the chamber in a direction opposite to the direction of the flow of the slurry to form thiourea and calcium hydrosulfide. Carbon dioxide gas is fed into the chamber downstream from the introduction of the hydrogen sulfide and caused to flow in the chamber in a direction opposite to the flow of the slurry to produce calcium carbonate and regenerate hydrogen sulfide gas which gas is caused to flow in the chamber in a direction opposite to the direction of flow of the slurry to form further thiourea and calcium hydrosulfide and the feed rates are controlled to balance the system, and the thiourea is recovered from the withdrawn reaction products.

---

The invention relates to the production of thiourea by the interaction of calcium cyanamide with hydrogen sulfide and carbon dioxide.

SUMMARY OF INVENTION

The invention provides a new and improved method for producing thiourea wherein the thiourea is continuously produced in a highly efficient manner.

The invention provides a new and improved process for producing thiourea wherein a reaction liquid containing calcium cyanamide is caused to flow continuously through a vessel including tandem reaction zones into which gaseous hydrogen sulfide and carbon dioxide, respectively, are fed continuously, to continuously produce an aqueous solution of thiourea from which the thiourea is separated.

DETAILED DESCRIPTION OF INVENTION

Figure 1:
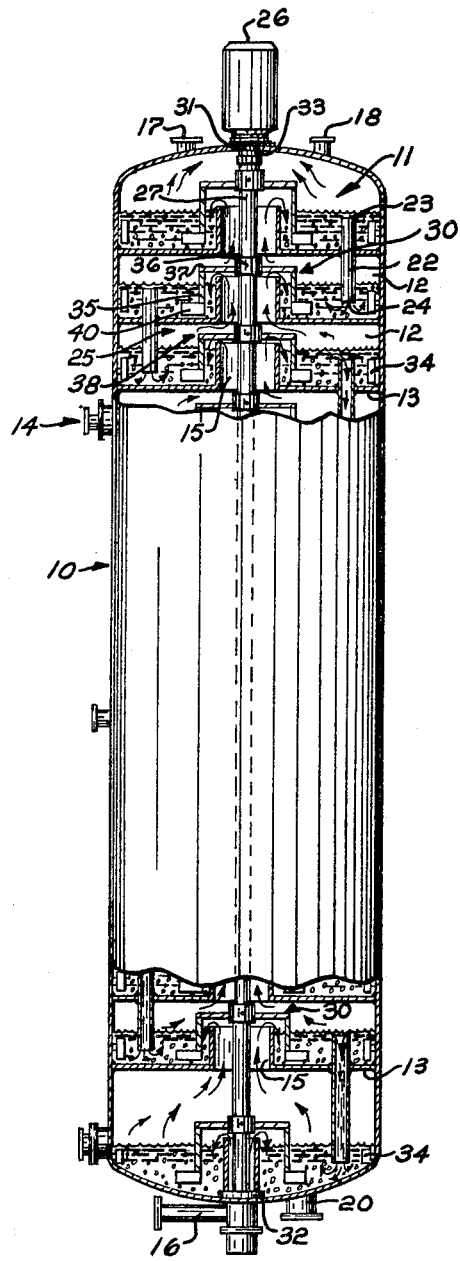
FIG. 1 is a fragmentary sectional elevational view of a reactor suitable for producing thiourea according to the present invention.

In accordance with the present invention, an aqueous solution of thiourea is produced as a continuous process by causing an aqueous slurry of calcium cyanamide to flow through successive reaction zones into which hydrogen sulfide gas and carbon dioxide respectively, are continuously fed. The conversion occurs according to the following reactions:

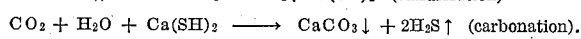

In accordance with these reactions, the calcium cyanamide slurry is converted to an aqueous solution containing thiourea and calcium hydrosulfide and this solution is subsequently reacted with carbon dioxide to produce a precipitate of calcium carbonate and regenerate of hydrogen sulfide gas, so that an aqueous solution of thiourea and calcium carbonate remains. The regenerated hydrogen sulfide gas participates in the sulfurization of unconverted calcium cyanamide thus forming an internal recycle of hydrogen sulfide. This permits the introduction of only one mole of hydrogen sulfide per mole of calcium cyanamide, and eliminates the problem of hydrogen sulfide recovery.

As representing a preferred embodiment of the present invention, FIG. 1 discloses means for producing an aqueous solution of thiourea from which the thiourea is subsequently recovered. The means includes a vertically oriented reactor vessel 10 having a chamber 11 therein. The vessel 10 includes a plurality of reaction compartments 12 formed by partition members 13, inlet means for introducing the chemical reactants into the chamber, and outlet means for delivering the reaction products from the chamber. While production of thiourea in accordance with the process of the present invention is preferably effected in a vertical reactor vessel, which will be described hereinafter, the process may be practiced using horizontally directed flows of liquid and gas, or in a series of tanks or a combination.

Hydrogen sulfide gas is introduced into the chamber 11 through an inlet means 14 which is preferably located approximately two-thirds up the reactor. The hydrogen sulfide is introduced into the chamber under a slight positive pressure and flows upwardly in the chamber through risers 15 formed in the members 13. The carbon dioxide gas is introduced into the chamber through an inlet means 16, preferably located at the bottom of the reactor, and is directed upwardly through the reaction compartments 12 by the risers 15 in the partition members 13 in the same manner as described in reference to the hydrogen sulfide gas. Any unreacted and inert gases which may be present in the chamber are delivered from the vessel 10 through an effluent gas outlet 17.

A calcium cyanamide slurry is introduced into the chamber 11, through an inlet 18 at the top of the vessel 10, and encounters hydrogen sulfide gas which is flowing upwardly through the reactor. As the calcium cyanamide is passed between the reaction compartments in the upper portions of the reactor, it reacts with the hydrogen sulfide gas to form a reaction liquid containing hydrogen cyanamide and calcium hydrosulfide. As this reaction liquid continues to flow downwardly through the reactor, it encounters hydrogen sulfide gas in increasing quantities. The excess hydrogen sulfide gas reacts with any free hydrogen cyanamide to form thiourea. It is preferred that excessive quantities of hydrogen sulfide gas are present at the time the hydrogen cyanamide is formed to prevent polymerization of the hydrogen cyanamide into the undesired organic impurity, dicyandiamide. The portion of the chamber 11 in which the reaction is predominately that of hydrogen sulfide reacting with calcium cyanamide and hydrogen cyanamide may be termed a sulfurization zone.

When the reaction liquid is descended through the upper portion of the reactor 10 it descends into the lower two-thirds of the reactor chamber and encounters carbon dioxide gas. The carbon dioxide gas is operative, in the presence of water, to react with the calcium sulfide to form calcium carbonate and hydrogen sulfide. The portion of the vessel in which this reaction occurs may be termed the carbonization zone. As a result of this carbonization reaction, hydrogen sulfide gas is regenerated and flows upwardly through the chamber. The regenerated hydrogen sulfide gas is moved upwardly through the chamber and combines with the hydrogen sulfide gas introduced through the inlet 14 to react with the calcium cyanamide slurry and hydrogen cyanamide solution as described. The calcium carbonate is insoluble in water and precipitates out of the solution such that the remaining solution comprises thiourea and water.

As the reaction liquid continues to flow downwardly through the reactor vessel, the liquid encounters greater amounts of carbon dioxide which insures that the calcium hydrosulfide has been completely reacted, and also that the reaction liquid is completely stripped to remove the dissolved hydrogen sulfide gas, which is a very important function in practical operation. The reaction liquid is then directed from the chamber by an outlet means 20. The liquid passing through the outlet means 20 contains a slurry of calcium carbonate in an aqueous solution of thiourea. The calcium carbonate, of course, may be separated from the liquid in any convenient manner, such as by filtration or centrifuging, and the thiourea then may be concentrated by means which are well known to those skilled in the art to which this invention relates.

The partition members 13 divide the chamber into a vertical array of reaction compartments. The partition members 13 are preferably flat annular members having outer peripheral edges which are secured to an inner peripheral wall of the vessel 10 in fluid tight engagement. The members 13 each include a central riser 15. The calcium cyanamide slurry introduced into the chamber is contained by successive partition members 13 as it flows downwardly through the vessel. In the preferred embodiment fourteen reaction compartments are provided.

The reactor 10 is constructed so that the gases flowing therethrough must pass into the liquid in each successive reaction compartment by a separate flow path. Each of the partition members 13 is provided with a downcomer 22 which directs liquid between successive ones of the partition members 13. Each downcomer 22 is positioned in a partition member 13 so that an upper end 23 extends upwardly a predetermined distance from the partition member such that the top thereof is directly below the top of the riser 15 so that the level of the liquid in the compartment may be maintained at a predetermined height. A lower end 24 of the downcomer extends to below the level of liquid in the adjacent compartment formed by the next partition member 13, so that liquid contained in one compartment is directed downwardly to an adjacent compartment through the downcomer 22. Thus the flow of gas through the downcomers is substantially eliminated by positioning the ends of the downcomers below the liquid level in successive compartments. The riser 15 extends above the level of the liquid a sufficient distance to prevent the liquid from flowing downwardly therethrough. Additionally the reactor is provided with means, to be described in detail hereinafter, which prevents the flow of gas directly through the reactor through the risers 15.

The reactor vessel 10 includes agitator means 25 for mixing the gases into the reaction and preventing the substances held in suspension in the liquid from settling out on the partition members 13. The agitator means 25 includes a drive unit 26 and a drive shaft member 27 carrying a plurality of turbine impeller assemblies 30 and which extends into the chamber 11 and through the risers 15 formed in the partition members 13. The shaft member 27 is supported for rotation relative to the vessel by bearings 31 and 32 which are supported in opposite ends of the vessel 10. A water lubricated seal 33 is provided between the shaft member 27 and the vessel adjacent the bearing 31.

The turbine impeller assemblies 30 rotate with the shaft 27 and are operative on rotation of the shaft member to entrain the gases into the liquid contained in the compartment and to prevent settling of any insoluble matter which may be suspended in the liquid. The impellers promote mass transfer from the gas to the reactive liquid and provide means to maximize the residence time of the gas bubble in the liquid. Additionally the reaction liquid supported by the partition members 13 is maintained in a turbulent condition by baffle plates 34 which are positioned equally on the tank wall and set out from the wall to eliminate the possibility of stagnant pockets in front of them.

Each of the turbine impeller assemblies is identical in construction and therefore only one impeller assembly and its mode of operation with an associated partition member will be described. The impeller assembly 30 includes an impeller member 35 secured to the shaft member 27 for rotation therewith by a hub 36. The hub 36 supports an annular disc-like member 37 the periphery of which is connected to an annular ring member 38 extending downwardly from the disc member and which carries impeller blades 40 emanating radially at a lower end thereof. The impeller assembly 30 is constructed so that the members 37, 38 form an inverted cup which extends over the riser 15 formed on the partition member.

The inverted cups formed by the members 37, 38 are imperforate and extend from the shaft member to below the level of the liquid in the compartments formed by the partitions 13 such that gas flowing upwardly through the risers 15 in the partitions 13 will be induced and dispersed into the liquid contained therein. Movement of the impeller blades 40 in the compartments produces a high degree of shear to the gas bubbles to continually distort the bubbles and prevent static interface. Entraining the gas into the liquid provides a large surface contact between the liquid and gas thus causing an intimate contact between the constituents thereof to encourage chemical reaction between the gas and liquid. The gas escaping from the liquid is, of course, prevented from directly mixing with the gas in adjacent reaction compartments by the inverted cup. In addition to preventing gases from directly communicating between adjacent reaction compartments the cup prevents any liquid which is splashed over the risers 15 from falling through the chamber 11 without passing into the partition 13 of a subsequent reaction compartment.

The following specific example illustrates a process for producing an aqueous solution of thiourea in accordance with the present invention. The parts and percentages given are parts and percentages by weight.

A slurry containing about 12 percent calcium cyanamide, about 8 percent thiourea, and 80 percent water is introduced into the reactor vessel 10 through a slurry inlet 17 at the top of the vessel. The inlet slurry temperature is preferably about 70° F. Gaseous hydrogen sulfide is introduced continuously into the vessel through an inlet 14, at a pressure of about 2 pounds per square inch gauge pressure at approximately 100° F. Carbon dioxide is continuously introduced into the chamber through gas inlet 16 located at the bottom of the chamber 11.

The calcium cyanamide slurry flows downwardly through the reactor vessel and through the reaction stages in a manner previously described and the hydrogen sulfide and carbon dioxide gases are counter flowed through the chamber as described. The chamber 11 is maintained at a reaction temperature at approximately 110° to 115° F. The gases are mixed with the reaction liquid by the agitator means 30 which has a peripheral speed of approximately 1100 feet per minute and a tank diameter-impeller diameter ratio of 2.0 to 1. The effluent unreacted and inert gases are bled off from the top of the reactor through an effluent gas outlet 17 at zero to 2 pounds per square inch gauge while the reaction products of an aqueous solution of thiourea containing suspended particles of calcium carbonate are withdrawn from an outlet 20 at the bottom of the chamber.

The amount of hydrogen sulfide introduced into the chamber through the inlet nozzle 14 corresponds with the amount of calcium cyanamide slurry introduced into the chamber such that one mole of hydrogen sulfide is introduced per mole of calcium cyanamide introduced into the vessel. Three moles of hydrogen sulfide are introduced initially. As the internal recycle hydrogen sulfide approaches two moles, the feed is adjacented to compensate for this increased availability of hydrogen sulfide in the sulfurization zone. Similarly, the amount of carbon dioxide introduced into the chamber through the inlet nozzle 16 corresponds with the amount of calcium cyanamide such that one mole of carbon dioxide is introduced per mole of calcium cyanamide introduced into the chamber. The hydrogen sulfide regenerated by the reaction between the carbon dioxide and the calcium sulfide solution provides an excess of hydrogen sulfide in the reaction vessel and thus insures that any hydrogen cyanamide is completely reacted into thiourea before polymerization of the hydrogen cyanamide. The reaction between hydrogen sulfide and calcium cyanamide is exothermal so that cooling of the reactor vessel adjacent regions where this reaction is occurring is usually necessary to hold the reaction temperature within the desired range. This cooling of the reactor vessel may be accomplished in a conventional manner by external cooling jackets and means for accomplishing such cooling has not been shown.

Having described our invention, we claim:

1. The method of producing thiourea comprising: continuously introducing an aqueous calcium cyanamide slurry into a closed chamber, directing flow of the slurry through the chamber in one direction, continuously introducing hydrogen sulfide gas into the chamber downstream from the introduction of the slurry at the rate of about one mole per mole of calcium cyanamide introduced and directing flow of the hydrogen sulfide gas in the chamber in a direction opposite to the direction of the flow of the slurry to form thiourea and calcium hydrosulfide at thiourea synthesis temperatures, continuously introducing carbon dioxide gas into the chamber downstream from the introduction of the hydrogen sulfide at the rate of about one mole per mole of calcium cyanamide introduced and directing flow of the carbon dioxide gas in the chamber in a direction opposite to the flow of the solution containing thiourea and calcium hydrosulfide to produce calcium carbonate and regenerate hydrogen sulfide gas, directing bow of the regenerated hydrogen sulfide gas in the chamber in a direction opposite to the direction of flow of the solution to form further thiourea and calcium hydrosulfide, continuously withdrawing the reaction products from the chamber downstream from the introduction of the carbon dioxide, and recovering the thiourea.

References Cited

UNITED STATES PATENTS

| 2,393,917 | 1/1946 | Lewis | 260—552 |
| 2,266,211 | 12/1941 | Lerch et al. | 260—552 |
| 2,006,762 | 7/1935 | Gams et al. | 260—552 |

LEON ZITVER, Primary Examiner

MICHAEL W. GLYNN, Assistant Examiner

U.S. Cl. X.R.

23—283